Patented June 29, 1954

2,682,482

UNITED STATES PATENT OFFICE 2,682,482

METHOD OF INSOLUBILIZING THE SURFACE OF CARBOHYDRATE BODIES

William B. Hewson, Wilmington, Del., assignor to Hercules Powder Company, Wilmington, Del., a corporation of Delaware No Drawing. Application June 30, 1951, Serial No. 234,680

8 Claims. (Cl. 117—63)

This invention relates to organic solvent-soluble carbohydrate derivatives having substituted anhydroglucose repeating units in which substituents having unsaturated functional groups dimerizable by peroxide catalysts are present and more particularly to the insolubilization of said carbohydrate derivatives by catalytic dimerization of the functional groups.

Numerous organic solvent-soluble carbohydrate derivatives having substituents which are unsaturated and capable of interaction of the polymerization type by being subjected to polymerization conditions are known. Cellulose acetate methacrylate and allyl cellulose are typical examples. The interest in these derivatives lies in their capability of being insolubilized by a polymerization or cross-linking reaction between unsaturated groups of adjacent molecules. The insolubilization has heretofore been effected by mixing a polymerization catalyst such as an organic peroxide with the carbohydrate derivative and subsequently heating at a temperature adequate for effecting cross-linking, or by exposing the surface of a shaped article of such material to ultraviolet light so as to insolubilize the surface by a cross-linking reaction. In either case the insolubilizing treatment requires uneconomically long periods of time.

Now in accordance with the present invention, it has been found that organic solvent-soluble carbohydrate derivatives of this type which are amenable to cross-linking reactions are rendered insoluble in organic solvents with substantial improvement in time and temperature requirements by heating the carbohydrate derivative and a peroxide capable of catalyzing polymerization reactions dispersed therein in contact with an aqueous swelling medium at a temperature within the range of about 40° C. to 150° C. The insolubilization is carried out on the carbohydrate derivative in the form of a shaped body and the insolubilization may vary in degree and if not uniform throughout will be greatest at the surfaces where activation due to contact with the swelling medium has accelerated the cross-linking reaction to the greatest degree.

The insolubilization process is carried out by compounding an organic solvent-soluble carbohydrate derivative having substituted anhydroglucose repeating units, in which the substituents include unsaturated functional groups dimerizable by peroxide catalysts, and the degree of substitution of said substituents is sufficient to effect insolubilization by dimerization or cross-linking thereof, in admixture with a peroxide catalyst soluble therein, or compatible therewith, and forming a shaped body whose surfaces are to be insolubilized, and heating the shaped body at a temperature within the range of about 40° C. to 150° C. in contact with an aqueous swelling medium. The heating is continued until any desired degree or depth of insolubilization desired is achieved.

The following examples illustrate the method of insolubilization as applied to certain organic solvent-soluble carbohydrate derivatives having substituted anhydroglucose repeating units in which there are substituents having unsaturated functional groups dimerizable by peroxide catalysts. All parts and percentages unless otherwise designated are by weight.

Example I

Cellulose acetate sorbate having a sorboyl D. S. (degree of substitution) of 0.09 and a total degree of substitution (acetyl and sorboyl) of about 3 was prepared by moistening 100 parts cellulose with 52.5 parts glacial acetic acid and mixing with 1875 parts methylene chloride, 972 parts acetic anhydride and 322 parts of a mixture prepared by heating together equal parts of sorbic acid and acetic anhydride, and as a catalyst 2.7 parts 72% perchloric acid admixed with 4.9 parts 70% zinc chloride solution. This mixture, after kneading in an acetylator at 22–25° C. for 16 hours, was then worked up by adding 5.8 parts 32% aqueous sodium acetate with continued kneading and subsequently diluting the reaction dope with acetone and pouring the resulting solution into anhydrous methanol. The cellulose acetate sorbate was obtained as a precipitate which was purified by washing with methanol and then with water, and finally was dried in air at 30° C. This triester showed, by bromine titration for unsaturation, the presence of sorbyl groups in an amount corresponding to a D. S. of 0.09. The triester was soluble in a 9:1 mixture of methylene chloride and ethanol. A 10–15% solution of the triester was made up in this solvent mixture and 1% benzoyl peroxide based upon the weight of the triester was added as a catalyst. A film having a thickness of about 3 mils was cast from this solution and dried in air at 30° C. One sample of this film was rendered insoluble in methylene chloride-ethanol (9:1) by heating at 100° C. in boiling water for about 10 minutes. Another sample of film was heated in the absence of moisture in an oven at 100° C. for 10 minutes and it was still soluble in methylene chloride-ethanol (9:1).

Example II

Samples of the film of Example I were heated in a 50% solution of ethanol in water (80° C.) to determine the minimum length of time for rendering the surface insoluble in a methylene chloride-ethanol (9:1) mixture. The minimum heating period required was 0.5 minute.

Example III

Samples of cellulose acetate sorbate films of Example I were heated at 80° C. in a 50% solution of ethanol in water containing dissolved therein 0.5% benzoyl peroxide based on the weight of the solution. Samples were withdrawn at intervals to determine the time required for surface insolubilization of the film in methylene chloride-ethanol (9:1). The minimum time required was 0.4 minute.

Example IV

Cellulose acetate propionate sorbate was prepared by mixing 20 parts cellulose, which had been pretreated with 10 parts of acetic acid, with 3.62 parts sorbic acid and a mixture of 101 parts propionic anhydride, 166 parts methylene chloride, 0.16 part 72% perchloric acid, and 0.43 part 70% zinc chloride solution. After 72 hours mixing at room temperature, 5 parts 32% sodium acetate solution was added and mixing was continued for 10 minutes. The resulting dope was diluted with acetone and precipitated by pouring into anhydrous methanol. The precipitate was washed with methanol, then water dehydrated with methanol and dried in vacuo for 3 hours at 65° C. The resulting triester had an acetyl D. S. of about 0.2, propionyl D. S. of about 2.72, and sorboyl D. S. of 0.08. The resulting triester was soluble both in acetone-ethanol (9:1) and in methylene chloride-ethanol (9:1). A 5% solution containing 1% benzoyl peroxide based on the weight of the triester was prepared in methylene chloride-ethanol. A film having a thickness of 3 mils was cast from this solution and dried at 65° C. The resulting film was still soluble in methylene chloride-ethanol (9:1). A sample of the film was rendered insoluble by 10 minutes heating at 80° C. in 30% ethanol.

Example V

Cellulose acetate sorbate having a total acyl D. S. of about 2.6 was prepared in the following manner: 100 parts cellulose moistened with 40 parts glacial acetic acid was mixed with 13.6 parts sorbic acid and was then kneaded with a mixture of 417 parts methylene chloride, 180 parts acetic anhydride, and 1.25 parts 95.5% sulfuric acid dissolved in 66.7 parts acetic anhydride for 1.2 hours while the temperature was allowed to rise gradually to about 45–52° C. After 7.5 hours kneading the acylation reaction was stopped by the addition of 67 parts water followed by continued kneading for 15 hours. The acetylated mixture was then hydrolyzed by kneading with 7.66 parts 95.5% sulfuric acid dissolved in 8.75 parts acetic acid for 6 hours at 48–52° C. After the addition of 87 parts 32% sodium acetate, kneading was continued for 2.0 hours. The partially hydrolyzed ester was isolated by removing the methylene chloride under reduced pressure and then kneading the product with fresh water. The resulting product was ground while wet and washed thoroughly with water and finally dried at 50–90° C. This product had a sorboyl D. S. of 0.06 and an acetyl D. S. of 2.49. It was readily soluble in an acetone-ethanol solution (9:1). A 25% solution of this ester in 96% acetone (4% water) was made up with 1% benzoyl peroxide based upon the total solids. This solution after filtration and deaeration was spun into a yarn of 92 denier, 28 filament with a one-half twist per inch. This yarn was spun under tension and was dried by hot air at 50–60° C. with a two-second contact time. The resulting yarn was still soluble in methylene chloride-ethanol (9:1). Samples of the yarn were heated at 85° C. in a 20% solution of ethanol in water containing dissolved therein 0.1% benzoyl peroxide. Complete insolubilization of the yarn in methylene chloride-ethanol (9:1) was achieved by 10 minutes of such treatment. The insolubilized yarn was insoluble in chlorinated dry cleaning solvents.

Example VI

A film of cellulose acetate crotonate was cast from a solution of cellulose acetate crotonate (crotonyl D. S. 0.4, acetyl D. S. 2.2) containing 1% benzoyl peroxide based on the total solids. The film after drying at 30° C. was soluble in methylene chloride-ethanol (9:1) and was rendered completely insoluble in that solvent mixture by heating for 20 minutes in a 20% solution of ethanol in water at about 80° C.

Example VII

A film of allyl starch (allyl D. S. about 2) containing 1% benzoyl peroxide was cast from an acetone solution of the allyl starch. The resulting film was soluble in butyl acetate. A sample of the film after heating in boiling water in an open vessel for 20 minutes was completely insoluble in butyl acetate.

Example VIII

A film of ethyl cellulose acrylate (acrylate D. S. about 0.2, ethyl D. S. 2.4) containing dissolved therein 1% benzoyl peroxide was soluble in a 4:1 toluene:ethanol mixture. A sample of the film after heating at about 80° C. for 20 minutes in a 5% aqueous ethanol solution containing 0.1% benzoyl peroxide was almost completely insoluble in 4:1 toluene:ethanol mixture.

The insolubilization process of this invention has been found to be applicable to all organic solvent-soluble carbohydrate derivatives having substituents which are unsaturated and capable of interaction of the polymerization type when subjected to polymerization conditions. As further examples of such carbohydrate derivatives, the following are typical: cellulose acetate methacrylate, cellulose propionate methacrylate, cellulose acetate acrylate, cellulose propionate acrylate, cellulose crotonate, cellulose acetate crotonate, cellulose stearate crotonate, cellulose acetate tiglate, cellulose acetate cinnamate, and the corresponding starch esters and, in general, esters of polymerizable unsaturated acids and cellulose or starch, esters of polymerizable unsaturated acids, and partially substituted cellulose and starch esters, or esters of polymerizable unsaturated acids and partially substituted starch or cellulose ethers or hydroxy alkyl ethers of cellulose or starch. Similarly, the process is applicable to the ethers of the above-designated partially substituted cellulose derivatives wherein the unsaturated ether group is a polymerizable ether group. The unsaturated polymerizable acid groups with which cellulose and starch derivatives may be substituted for the production of carbohydrate derivatives operable in the process of this invention include acrylic acid, methacrylic acid, crotonic acid, tiglic acid, sorbic acid, cinnamic acid, monoethyl maleate, monomethyl maleate, and similar unsaturated acids. Where the substituent of the organic solvent-soluble carbohydrate derivative is an unsaturated ether group, the unsaturated ether groups which may be present in such carbohydrate derivatives include the following: vinyl, allyl, methallyl, crotyl, and the like. The unsaturated substituents may be all identical or they may be mixed and there may be present both unsaturated ester groups and unsaturated ether groups.

The amount of unsaturated substituents, i. e., their degree of substitution, in the carbohydrate derivative will vary with the character of the unsaturated substituent as is well known in the art. Many of these carbohydrate derivatives having polymerizable unsaturated groups are well known in the art and have heretofore been insolubilized by heating in the dry state or by exposing to ultraviolet light in the dry state and the D. S. of the unsaturated substituents required for insolubilization is substantially the same in the present process as in the prior art processes. The cellulose derivatives may be completely or partially substituted.

The insolubilization process of the present invention depends upon the presence of a catalyst intimately mixed with and dispersed in the composition of the insolubilizable carbohydrate derivative, said polymerization catalyst being capable of effecting a cross-linking or polymerization within the temperature of the treatment. Peroxygen compounds are generally used as catalysts. The polymerization catalyst is preferably an organic peroxide such as benzoyl peroxide, acetyl peroxide, perbenzoic acid, cumene hydroperoxide, t-butyl hydroperoxide, di-t-butyl peroxide, dicymyl peroxide, dibenzal diperoxide, and homologs thereof. The amount of catalyst is generally within the range of 0.1 to 5% and is preferably about 0.5–2% based on the insolubilizable carbohydrate derivative.

The present process is utilized for insolubilizing formed articles or shaped bodies of the insolubilizable carbohydrate derivative. These formed articles or shaped bodies may be in various forms such as films, filaments, fibers, hollow bodies, coatings on formed articles or shaped bodies, solid shaped bodies, and the like, the surfaces of which are exposed and amenable to swelling by contacting with a swelling agent.

The insolubilization process appears to be dependent upon an increase in the mobility of either the carbohydrate molecule or of the catalyst or of the free radicals produced by the catalyst in the solid shaped body, or combinations thereof. It is believed that this mobility results from the swelling action of the swelling agent on the surface of the shaped body. For surface insolubilization, the depth of penetration of the swelling agent need not be great and in any process in which surface insolubilization takes place, partial insolubilization to varying depths within the shaped body will also be effected to varying degrees depending upon the nature of the swelling agent, the temperature of insolubilization, the nature of the carbohydrate derivative, and the activity of the catalyst. In the case of thin films, filaments of small diameter, and the like, particularly where the swelling agent can reach all surfaces, the insolubilization is generally readily effected throughout the shaped body.

The swelling agents which are effective in the process of this invention include water and aqueous solutions of organic solvents which in the absence of substantial quantities of water would swell or dissolve the cellulose derivative. When the swelling medium includes such an organic solvent or swelling agent, the organic solvent or swelling agent is preferably one which is volatile at 100° C. so that it is readily evaporated from the surface of the formed body. In any swelling composition in which the organic solvent is a good solvent for the cellulose derivative, it is important that water be present in sufficient amount to inhibit solubilization completely at the temperature used. In any suitable composition there appears to be a minimum useful amount of water which is within the range of about 30 to about 40% of the swelling medium. The swelling medium may be substantially entirely water or it may be an aqueous solution of an organic solvent containing up to about 70% of the organic solvent. The organic solvents which may be used in the swelling medium include substantially all of the lower molecular weight water-miscible volatile organic solvents. Examples of such solvents are methanol, ethanol, propanol, isopropyl alcohol, acetone, dioxane, glycol, acetic acid, tertiary butyl alcohol, and monomethyl and monoethyl ethers of glycol and glycerol. Suitable aqueous swelling media will vary in composition with the carbohydrate composition involved, but will be readily selected by one skilled in the art.

The aqueous swelling medium may be used without any polymerization catalyst dissolved therein or it may be used to advantage with a small percentage of the polymerization catalyst dissolved therein. It is particularly advantageous to use a polymerization catalyst in the swelling medium in those cases where the polymerization catalyst which is dispersed in the polymerizable cellulose derivative is soluble in the swelling medium and tends to be dissolved out thereby. Although the catalyst used in solution in the swelling medium is preferably the same catalyst as is used in the shaped body formed from the insolubilizable cellulose derivative, the catalyst may be a different catalyst provided it is compatible with the catalyst dispersed in the shaped body. Examples of catalysts which may be used in the swelling medium include potassium persulfate, hydrogen peroxide, peracetic acid, and sodium perborate in addition to those disclosed for use in the plastic composition itself. When a catalyst is used in the swelling medium, it may be used in amounts up to about 5.0% of the swelling medium and is preferably used in the range of about 0.01% to about 0.5% of the swelling medium.

The temperature which is used in the insolubilization process may be any temperature within the range from that required to activate the polymerization catalyst up to about 150° C. The lower temperature range varies somewhat with the catalyst and appears to be dependent upon the temperature required for breakdown of the catalyst into free radicals. This minimum temperature will generally be within the range of about 40° C. to 90° C. A convenient temperature range for the insolubilization process is the refluxing temperature of the particular swelling medium used when operating under atmospheric pressure. This temperature will generally be within the range of about 50° C. to about 100° C.

Temperatures above 100° C. may be used in a closed system under pressure.

The process of insolubilization of the surface of the shaped bodies comprising the insolubilizable carbohydrate derivatives of this invention generally involves submerging the shaped body into the aqueous swelling medium at the selected temperature for a sufficient length of time to effect insolubilization of at least the surface of the shaped body. In such a process the swelling medium contacts the surfaces of the shaped body and it is those surfaces which are contacted which are insolubilized first and to the greatest extent. If desired, the insolubilization process may be continued to effect insolubilization to any depth from the surface which is desired. In the case of continuous films or filaments, the insolubilization process may be carried out by continuously passing the film or filament through a bath of the aqueous swelling medium, or a loosely coiled bundle or skein of the film or filament may be treated batchwise submerged in the aqueous swelling medium. The aqueous swelling medium is preferably used in the liquid state, for the greatest advantages of the present process are attained thereby.

Among the many advantages of the present process is the outstanding increase in speed of the insolubilization which makes much lower temperatures practical for the first time. This is a distinct improvement over the prior art dry heating processes of insolubilization or cross-linking of unsaturated carbohydrate derivatives because of the reduced exposure of the carbohydrate derivative to degradative conditions.

This application is a continuation-in-part of my copending application, Serial No. 203,797, filed December 30, 1950.

What I claim and desire to protect by Letters Patent is:

1. The method of rendering insoluble in organic solvents the surface of a shaped body wherein said surface comprises essentially an organic solvent-soluble derivative of a carbohydrate of the group consisting of starch and cellulose, said derivative having substituted anhydroglucose repeating units in which substituents, selected from the group consisting of ethers and esters and having unsaturated functional groups of ethylenic type dimerizable by peroxygen compounds, are present and the degree of substitution of said substituents is in the range of about 0.06 to about 2 and is sufficient to effect insolubilization by dimerization thereof, and dispersed therein from 0.1% to 5% of said derivative of an organic peroxide capable of catalyzing polymerization reactions at a temperature within the temperature range of about 40° to about 150° C., which comprises heating said shaped body at a temperature within said temperature range in contact with an aqueous swelling medium capable of swelling but not dissolving said derivative and selected from the group consisting of water and water containing up to about 70% of a water-soluble volatile organic solvent until said surface is rendered insoluble in said organic solvents.

2. The method of rendering insoluble in organic solvents the surface of a shaped body wherein said surface comprises essentially an organic solvent-soluble derivative of a carbohydrate of the group consisting of starch and cellulose, said derivative having substituted anhydroglucose repeating units in which substituents, selected from the group consisting of ethers and esters and having unsaturated functional groups of ethylenic type dimerizable by peroxygen compounds, are present and the degree of substitution of said substituents is in the range of about 0.06 to about 2 and is sufficient to effect insolubilization by dimerization thereof, and dispersed therein from 0.1% to 5% of said derivative of an organic peroxide capable of catalyzing polymerization reactions at a temperature within the temperature range of about 40° to about 150° C., which comprises heating said shaped body at a temperature within said temperature range in contact with an aqueous swelling medium capable of swelling but not dissolving said derivative and selected from the group consisting of water and water containing up to about 70% of a water-soluble volatile organic solvent, said medium containing dissolved therein a catalytic amount up to about 5% of said medium of a peroxygen compound capable of catalyzing polymerization reactions in said temperature range, until said surface is rendered insoluble in said organic solvents.

3. The method of rendering insoluble in organic solvents the surface of a shaped body wherein said surface comprises essentially an organic solvent-soluble derivative of a carbohydrate of the group consisting of starch and cellulose, said derivative having substituted anhydroglucose repeating units in which substituents, selected from the group consisting of ethers and esters and having unsaturated functional groups of ethylenic type dimerizable by peroxygen compounds, are present and the degree of substitution of said substituents is in the range of about 0.06 to about 2 and is sufficient to effect insolubilization by dimerization thereof, and dispersed therein from 0.1% to 5% of said derivative of an organic peroxide capable of catalyzing polymerization reactions at a temperature within the temperature range of about 40 to about 150° C., which comprises heating said shaped body at a temperature within said temperature range in contact with an aqueous swelling medium capable of swelling but not dissolving said derivative and selected from the group consisting of water and water containing up to about 70% of a water-soluble volatile organic solvent, said medium containing dissolved therein a catalytic amount up to about 5% of said medium of an organic peroxide capable of catalyzing polymerization reactions in said temperature range, until said surface is rendered insoluble in said organic solvents.

4. The method of rendering insoluble in organic solvents the surface of a shaped body wherein said surface comprises essentially an organic solvent-soluble derivative of a carbohydrate of the group consisting of starch and cellulose, said derivative having substituted anhydroglucose repeating units in which substituents, selected from the group consisting of ethers and esters and having unsaturated functional groups of ethylenic type dimerizable by peroxygen compounds, are present and the degree of substitution of said substituents is in the range of about 0.06 to about 2 and is sufficient to effect insolubilization by dimerization thereof, and dispersed therein from 0.1% to 5% of said cellulose derivative of an organic peroxide capable of catalyzing polymerization reactions at a temperature within the temperature range of about 40° to about 150° C., which comprises heating said shaped body at a temperature within said temperature range in contact with aqueous ethanol containing at least about 30% water and having dissolved therein a catalytic amount up to about 5% of said aqueous ethanol of an organic peroxide capable of catalyzing polymerization reactions in said temperature range, until said surface is rendered insoluble in said organic solvents.

5. The method of rendering insoluble in organic solvents the surface of a shaped body wherein said surface comprises essentially an organic solvent-soluble derivative of a carbohydrate of the group consisting of starch and cellulose, said derivative having substituted anhydroglucose repeating units in which substituents, selected from the group consisting of ethers and esters and having unsaturated functional groups of ethylenic type dimerizable by peroxygen compounds, are present and the degree of substitution of said substituents is in the range of about 0.06 to about 2 and is sufficient to effect insolubilization by dimerization thereof, and dispersed therein from 0.1% to 5% of said derivative of an organic peroxide capable of catalyzing polymerization reactions at a temperature within the temperature range of about 40° to about 150° C., which comprises heating said shaped body at a temperature within said temperature range in contact with an aqueous swelling medium comprising essentially water containing dissolved therein up to about 5% based on the said medium of an inorganic peroxygen compound, until said surface is rendered insoluble in said organic solvents.

6. The method of rendering insoluble in organic solvents the surface of a shaped body wherein said surface comprises essentially an organic solvent-soluble cellulose derivative having substituted anhydroglucose repeating units in which substituents, selected from the group consisting of ethers and esters and having unsaturated functional groups of ethylenic type dimerizable by peroxygen compounds, are present and the degree of substitution of said substituents is in the range of about 0.06 to about 2 and is sufficient to effect insolubilization by dimerization thereof, and dispersed therein from 0.1% to 5% of said cellulose derivative of an organic peroxide capable of catalyzing polymerization reactions at a temperature within the temperature range of about 40° to about 150° C., which comprises heating said shaped body at a temperature within said temperature range in contact with an aqueous swelling medium capable of swelling but not dissolving said derivative and selected from the group consisting of water and water containing up to about 70% of a water-soluble volatile organic solvent, until said surface is rendered insoluble in said organic solvents.

7. The method of rendering insoluble in organic solvents the surface of a shaped body wherein said surface comprises essentially an organic solvent-soluble starch derivative having substituted anhydroglucose repeating units in which substituents, selected from the group consisting of ethers and esters and having unsaturated functional groups of ethylenic type dimerizable by peroxygen compounds, are present and the degree of substitution of said substituents is in the range of about 0.06 to about 2 and is sufficient to effect insolubilization by dimerization thereof, and dispersed therein from 0.1% to 5% of said starch derivative of an organic peroxide capable of catalyzing polymerization reactions at a temperature within the temperature range of about 40° to about 150° C., which comprises heating said shaped body at a temperature within said temperature range in contact with an aqueous swelling medium capable of swelling but not dissolving said derivative and selected from the group consisting of water and water containing up to about 70% of a water-soluble volatile organic solvent, until said surface is rendered insoluble in said organic solvents.

8. The method of rendering insoluble in organic solvents the surface of a shaped body wherein said surface comprises essentially an organic solvent-soluble cellulose acetate sorbate having a sorboyl D. S. in the range of about 0.06 to about 2 having dispersed therein from 0.1% to 5% of said cellulose acetate sorbate of an organic peroxide capable of catalyzing polymerization reactions at a temperature within the temperature range of about 40° to about 150° C., which comprises heating said shaped body at a temperature within said temperature range in contact with an aqueous swelling medium capable of swelling but not dissolving said cellulose acetate sorbate and containing up to about 70% of a water-soluble volatile organic solvent, until said surface is rendered insoluble in said organic solvents.

References Cited in the file of this patent

UNITED STATES PATENTS

| Number | Name | Date |
|---|---|---|
| 2,322,575 | Hill | June 22, 1943 |
| 2,336,985 | Freund | Dec. 14, 1943 |
| 2,396,165 | Ernsberger | Mar. 5, 1946 |
| 2,406,369 | Hamilton et al. | Aug. 27, 1946 |
| 2,539,920 | Morgan | Jan. 30, 1951 |
| 2,558,047 | Gloor | June 26, 1951 |